(12) United States Patent
Lin et al.

(10) Patent No.: US 9,746,978 B2
(45) Date of Patent: Aug. 29, 2017

(54) CAPACITIVE TOUCH PANEL HAVING SINGLE-LAYER TOUCH SENSOR

(71) Applicant: Raydium Semiconductor Corporation, Hsinchu (TW)

(72) Inventors: Yi-Ying Lin, Hualien (TW); Kun-Pei Lee, Zhunan Township (TW); Hsin-Wei Shieh, New Taipei (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 73 days.

(21) Appl. No.: 14/867,680

(22) Filed: Sep. 28, 2015

(65) Prior Publication Data

US 2016/0092003 A1    Mar. 31, 2016

(30) Foreign Application Priority Data

Sep. 30, 2014   (TW) .............................. 103134023 A

(51) Int. Cl.
  *G06F 3/045*    (2006.01)
  *G06F 3/044*    (2006.01)
(52) U.S. Cl.
  CPC .................................. *G06F 3/044* (2013.01)
(58) Field of Classification Search
  CPC ....................................................... G06F 3/044
  USPC ........................................................ 345/174
  See application file for complete search history.

(56) References Cited

U.S. PATENT DOCUMENTS

| | | | | |
|---|---|---|---|---|
| 6,288,707 B1 * | 9/2001 | Philipp | ................. | G06F 3/0213 341/22 |
| 2005/0270039 A1 * | 12/2005 | Mackey | ................. | G06F 3/044 324/660 |
| 2006/0097991 A1 * | 5/2006 | Hotelling | ............. | G06F 3/0416 345/173 |
| 2007/0247443 A1 * | 10/2007 | Philipp | .................. | G06F 3/045 345/173 |
| 2008/0252608 A1 * | 10/2008 | Geaghan | ................. | G06F 3/044 345/173 |
| 2015/0062468 A1 * | 3/2015 | Hu | .................... | G02F 1/134309 349/12 |

\* cited by examiner

*Primary Examiner* — Adam R Giesy
*Assistant Examiner* — Chineyere Wills-Burns

(57) ABSTRACT

A capacitive touch panel is disclosed. The capacitive touch panel includes a laminated structure. The laminated structure includes a liquid crystal displaying module, a single-layer touch sensor, and a polarizing module. The single-layer touch sensor is disposed on the liquid crystal displaying module. The polarizing module is disposed on the single-layer touch sensor. The single-layer touch sensor includes a plurality of first electrodes and a plurality of second electrodes. The first electrodes and the second electrodes are configured in an asymmetric electrode arranging way, so that one of the first electrodes will be arranged corresponding to at least two of the second electrodes.

11 Claims, 5 Drawing Sheets

| T1 | R1 |
|    | R2 |
| T2 | R3 |
|    | R4 |
|    | R1 |
|    | R2 |
| T3 | R3 |
|    | R4 |
|    | R1 |
|    | R2 |
| T4 | R3 |
|    | R4 |
|    | R1 |
|    | R2 |
| T5 | R3 |
|    | R4 |
|    | R1 |
|    | R2 |
| T6 | R3 |
|    | R4 |
|    | R1 |
|    | R2 |
| T7 | R3 |
|    | R4 |

FIG. 7

| T1 | R1 |
|    | R2 |
| T2 | R3 |
|    | R4 |
|    | R1 |
|    | R2 |
| T3 | R3 |
|    | R4 |
|    | R1 |
|    | R2 |
| T4 | R3 |
|    | R4 |
|    | R1 |
|    | R2 |
| T5 | R3 |
|    | R4 |
|    | R1 |
|    | R2 |
| T6 | R3 |
|    | R4 |
|    | R1 |
|    | R2 |
| T1 | R3 |
|    | R4 |

CAPACITIVE TOUCH PANEL HAVING SINGLE-LAYER TOUCH SENSOR

BACKGROUND OF THE INVENTION

Field of the Invention

This invention relates to a capacitive touch panel, especially to a capacitive touch panel having a single-layer touch sensor.

Description of the Related Art

In general, the conventional capacitive touch panel uses multiple-layer sensing structure to sense touch points. However, it has disadvantages of complicated structure and higher cost. Therefore, the capacitive touch panel having a single-layer touch sensor is provided to use a single conductive layer to replace the conventional X-axis electrode layer and Y-axis electrode layer.

Please refer to FIG. 1A, FIG. 1B, and FIG. 2. FIG. 1A and FIG. 2 illustrate top-views of two different single-layer sensing structures of the conventional capacitive touch panel; FIG. 1B illustrates a cross-sectional diagram of the single-layer sensing structure along AA' in FIG. 1.

As shown in FIG. 1A, X-axis electrodes X1~X2 and Y-axis electrodes Y1~Y2 are disposed at the same plane through bridge structures BX and BY. However, once the bridge structures are used, the entire manufacturing processes and the material choice will become more complicated and the cost is hard to be reduced. For example, the bridge structure shown in FIG. 1A is usually made by three mask processes, the bridge structure BX of X-axis electrode and the bridge structure BY of Y-axis electrode can both use transparent material the same with the electrodes, such as ITO, IZO, nano-Ag, or nano-carbon tube, and an isolation layer ISO is disposed between the bridge structure BX of X-axis electrode and the bridge structure BY of Y-axis electrode as shown in FIG. 1B to prevent the short circuit. In fact, the material of the isolation layer ISO can be organic material or inorganic material.

As shown in FIG. 2, the X-axis electrodes X1~X3 and the Y-axis electrodes Y1~Y3 can be also disposed on the same plane through a symmetric arrangement that one Y-axis electrode corresponds one X-axis electrode; however, the traces LX1~LX3 of the X-axis electrodes X1~X3 and the traces LY1~LY3 of the Y-axis electrodes Y1~Y3 must be disposed within the active area of the conventional capacitive touch panel, this will make some active area of the conventional capacitive touch panel become inactive, and the touch sensing performance of the conventional capacitive touch panel will become poor.

Therefore, the invention provides a capacitive touch panel having a single-layer touch sensor to solve the above-mentioned problems.

SUMMARY OF THE INVENTION

A preferred embodiment of the invention is a capacitive touch panel. In this embodiment, a laminated structure of the capacitive touch panel includes a liquid crystal displaying module, a single-layer touch sensor, and a polarizing module. The single-layer touch sensor is disposed on the liquid crystal displaying module. The polarizing module is disposed on the single-layer touch sensor. The single-layer touch sensor includes a plurality of first electrodes and a plurality of second electrodes. The first electrodes and the second electrodes are configured in an asymmetric electrode arranging way, so that one of the first electrodes will be arranged corresponding to at least two of the second electrodes.

In an embodiment, the first electrode is disposed in a center part of the plurality of first electrodes instead of being disposed at two ends of the plurality of first electrodes.

In an embodiment, another first electrode of the plurality of first electrodes is disposed at one of the two ends of the plurality of first electrodes, and the another first electrode is arranged corresponding to another at least one second electrode of the plurality of second electrodes, the number of the another at least one second electrode corresponding to the another first electrode is smaller than that of the at least two second electrodes corresponding to the first electrode.

In an embodiment, another first electrode of the plurality of first electrodes is also disposed in the center part of the plurality of first electrodes instead of being disposed at the two ends of the plurality of first electrodes, the another first electrode is arranged corresponding to another at least two second electrodes of the plurality of second electrodes, and the number of the another at least two second electrodes corresponding to the another first electrode is equal to that of the at least two second electrodes corresponding to the first electrode.

In an embodiment, the at least two second electrodes are the same with the another at least two second electrodes.

In an embodiment, the at least two second electrodes are different from the another at least two second electrodes.

In an embodiment, another first electrode and still another first electrode of the plurality of first electrodes are disposed at the two ends of the plurality of first electrodes respectively, and the another first electrode is arranged corresponding to another at least one second electrode of the plurality of second electrodes and the still another first electrode is arranged corresponding to still another at least one second electrode of the plurality of second electrodes.

In an embodiment, the number of the another at least one second electrode corresponding to the another first electrode is equal to that of the still another at least one second electrode corresponding to the still another first electrode.

In an embodiment, the another at least one second electrode is different from the still another at least one second electrode.

In an embodiment, the number of the another at least one second electrode corresponding to the another first electrode is different from that of the still another at least one second electrode corresponding to the still another first electrode.

In an embodiment, another first electrode of the plurality of first electrodes is disposed at the two ends of the plurality of first electrodes simultaneously, and the another first electrode is arranged corresponding to another at least one second electrode and still another at least one second electrode of the plurality of second electrodes corresponding to the two ends of the plurality of first electrodes simultaneously.

In an embodiment, the plurality of first electrodes is driving electrodes and the plurality of second electrodes is sensing electrodes.

In an embodiment, the plurality of first electrodes is sensing electrodes and the plurality of second electrodes is driving electrodes.

Compared to the prior art, the invention provides a capacitive touch panel having novel electrode configuration design of the first electrodes and the second electrodes (X-axis electrodes and Y-axis electrodes) in the single-layer touch sensor. Without the conventional bridge structures, the capacitive touch panel of the invention can effectively decrease the number of the traces disposed within the active area of the capacitive touch panel and the touch inactive area of the capacitive touch panel; therefore, the requirement of the signal processing at two ends of the electrodes can be enhanced and the touch sensor structure of the capacitive touch panel can be also simple to reduce its cost.

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4~FIG. 10 illustrate different electrode configurations of the first electrodes and the second electrodes in the single-layer touch sensor of the capacitive touch panel of the invention respectively.

DETAILED DESCRIPTION

A preferred embodiment of the invention is a capacitive touch panel having a single-layer touch sensor. In this embodiment, the capacitive touch panel can have on-cell laminated structure without cover lens and optical clear adhesive (OCA)/optical clear resin (OCR), but not limited to this.

Figure 3:
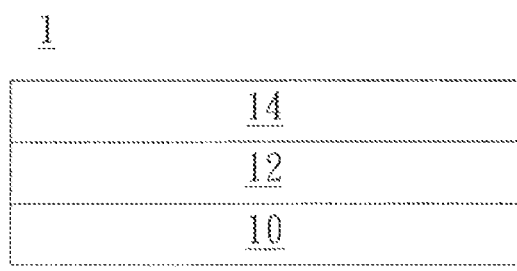
FIG. 3 illustrates a schematic diagram of the laminated structure of the capacitive touch panel in an embodiment of this invention.

As shown in FIG. 3, the laminated structure 1 of the capacitive touch panel can include a liquid crystal displaying module 10, a single-layer touch sensor 12, and a polarizing module 14. The single-layer touch sensor 12 is disposed on the liquid crystal displaying module 10. The polarizing module 14 is disposed on the single-layer touch sensor 12. The single-layer touch sensor 12 includes a plurality of first electrodes and a plurality of second electrodes disposed on the same plane.

In fact, the polarizing module 14 can include any kinds of polarizer; the first electrodes are driving electrodes and the second electrodes are sensing electrodes or the first electrodes are sensing electrodes and the second electrodes are driving electrodes; the shapes of the patterns of the first electrodes and the second electrodes and their geometric lines are not limited by a form of straight line; they can be shown in any curves of different curvatures or different curved forms or shown in any other regular or irregular geometric lines based on practical needs without specific limitations.

Figure 1A:
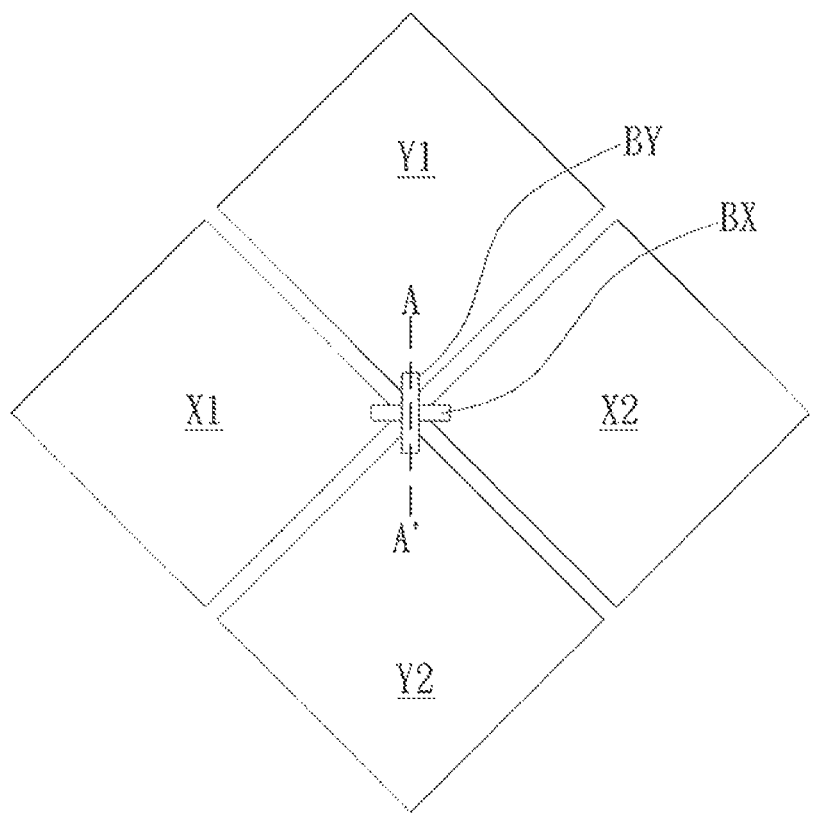
FIG. 1A and FIG. 2 illustrate top-views of two different single-layer sensing structures of the conventional capacitive touch panel.
Figure 1B:
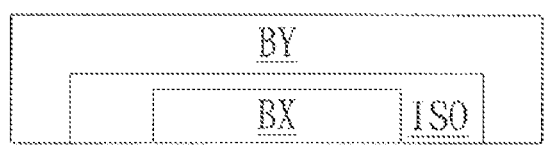
FIG. 1B illustrates a cross-sectional diagram of the single-layer sensing structure along AA' in FIG. 1.
Figure 2:
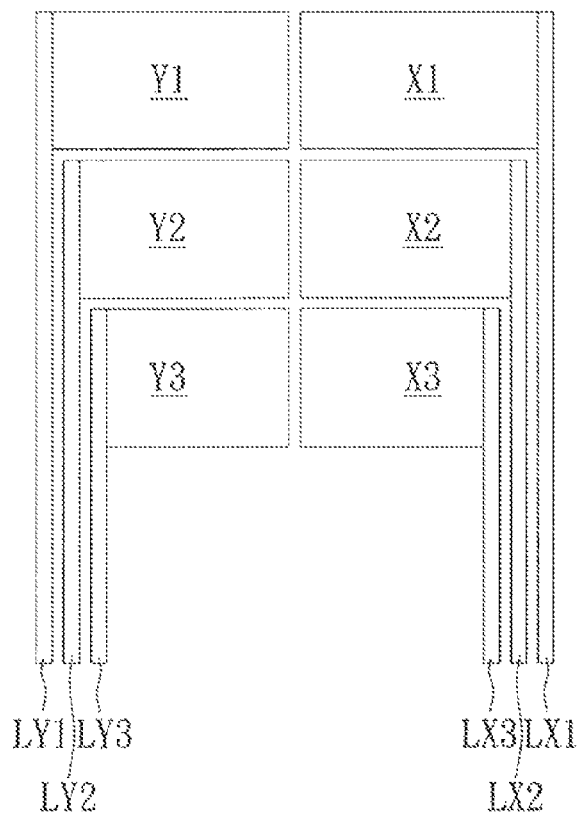

It should be noticed that the single-layer touch sensor 12 of the invention and the single-layer touch sensor of FIG. 2 in the prior art both include the first electrodes and the second electrodes (namely the X-axis electrodes and the Y-axis electrodes) disposed on the same plane; however, the X-axis electrodes X1~X3 and the Y-axis electrodes Y1~Y3 of FIG. 2 in the prior art are arranged in a 1:1 symmetric electrode configuration that one Y-axis electrode corresponds one X-axis electrode, but the first electrodes and the second electrodes of the single-layer touch sensor 12 of the invention are configured in an asymmetric electrode arranging way to effectively decrease the touch inactive area of the capacitive touch panel caused by the traces disposed within the active area of the capacitive touch panel and enhance the requirement of the signal processing at two ends of the electrodes.

Next, different embodiments illustrated in FIG. 4~FIG. 10 will be introduced in detail respectively. In the following embodiments, the first electrodes T1~T13 are Y-axis electrodes and the second electrodes R1~R4 are X-axis electrodes or the first electrodes T1~T13 are X-axis electrodes and the second electrodes R1~R4 are Y-axis electrodes without specific limitations. In addition, the first electrodes T1~T13 are used as driving electrodes and the second electrodes R1~R4 are used as sensing electrodes or the first electrodes T1~T13 are used as sensing electrodes and the second electrodes R1~R4 are used as driving electrodes without specific limitations.

Figures 4, 5:
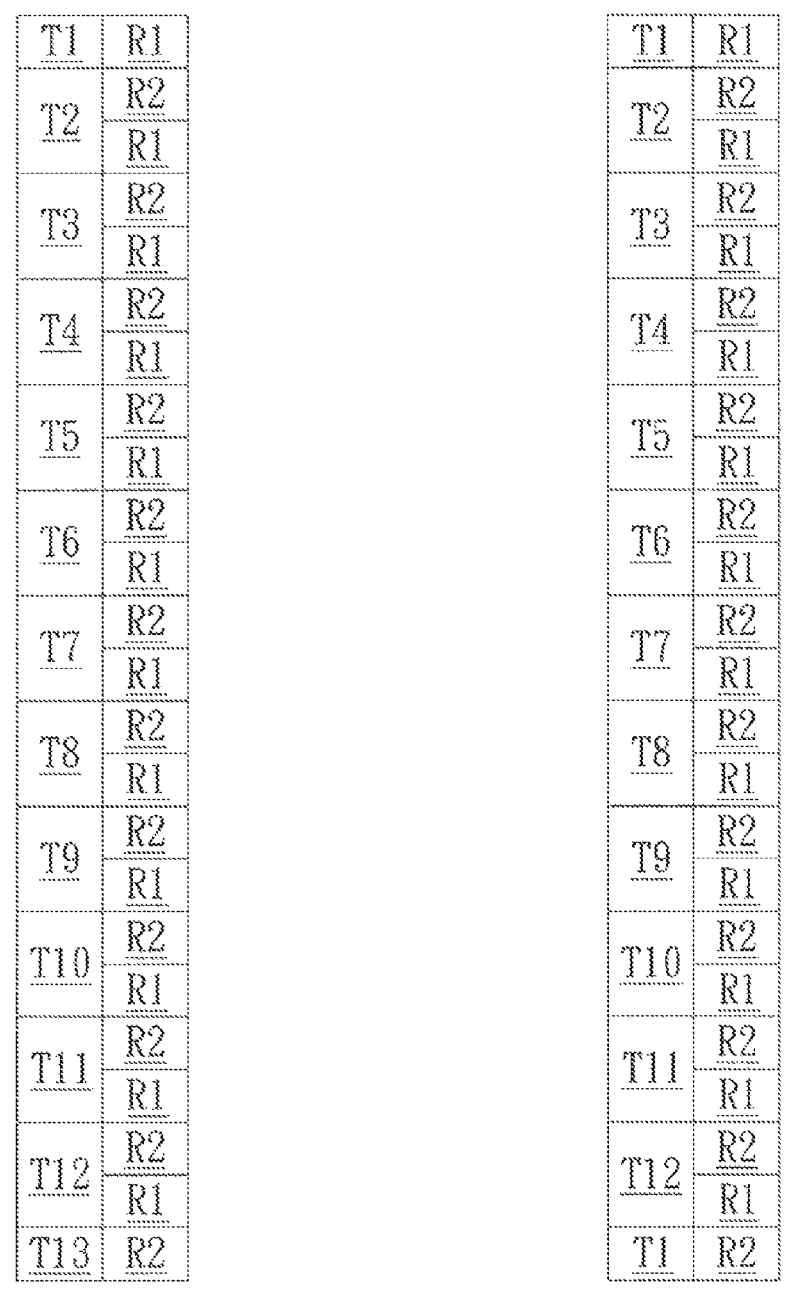

Please refer to FIG. 4. FIG. 4 illustrates a first embodiment of the electrode configuration of the first electrodes and the second electrodes in the single-layer touch sensor 12. As shown in FIG. 4, it is assumed that the first electrodes T1~T13 are X-axis electrodes and the second electrodes R1~R4 are Y-axis electrodes. The X-axis electrodes T1 and T13 disposed at two ends of the X-axis electrodes T1~T13 only correspond to one Y-axis electrode R1 or R2 respectively; each of the X-axis electrodes T2~T12 disposed at the center part of the X-axis electrodes T1~T13 corresponds to two Y-axis electrodes R1 and R2 respectively.

Compared to the prior art, the X-axis electrodes and the Y-axis electrodes of FIG. 4 use the electrode configuration that the X-axis electrodes at two ends of the X-axis electrodes are arranged more densely than the X-axis electrodes at the center part of the X-axis electrodes, so that the requirement of the signal processing at two ends of the X-axis electrodes can be satisfied. In addition, since two X-axis electrodes (e.g., X1 and X2) correspond to Y-axis electrodes Y1 and Y2 in FIG. 2 of the prior art, four traces are necessary to be distributed within the touch active area of the capacitive touch panel; however, as shown in FIG. 4, since one X-axis electrode (e.g., T2) disposed at the center part of the X-axis electrodes corresponds to two Y-axis electrodes R2 and R1, only three traces are necessary to be distributed within the touch active area of the capacitive touch panel. Therefore, the touch inactive area of the capacitive touch panel in this embodiment of the invention is smaller than that of the capacitive touch panel in the prior arts.

As shown in FIG. 5, in order to enhance driving efficiency in the same geometry configuration, the X-axis electrodes disposed at two ends of the X-axis electrodes in this embodiment can be electrically connected, namely the X-axis electrodes disposed at two ends of the X-axis electrodes are both T1 (or T13), but not limited to this.

Please refer to FIG. 6. FIG. 6 illustrates a second embodiment of the electrode configuration of the first electrodes and the second electrodes in the single-layer touch sensor 12. As shown in FIG. 6, it is assumed that the first electrodes T1~T7 are X-axis electrodes and the second electrodes R1~R4 are Y-axis electrodes. The X-axis electrodes T1 and T7 disposed at two ends of the X-axis electrodes T1~T13 only correspond to two Y-axis electrodes R1~R2 and R3~R4 respectively; each of the X-axis electrodes T2~T6 disposed at the center part of the X-axis electrodes T1~T7 corresponds to four Y-axis electrodes R1~R4 respectively.

Compared to the prior art, the X-axis electrodes and the Y-axis electrodes of FIG. 6 use the electrode configuration that the X-axis electrodes at two ends of the X-axis electrodes are arranged more densely than the X-axis electrodes at the center part of the X-axis electrodes, so that the requirement of the signal processing at two ends of the X-axis electrodes can be satisfied. In addition, since four X-axis electrodes correspond to four Y-axis electrodes in FIG. 2 of the prior art, eight traces are necessary to be distributed within the touch active area of the capacitive touch panel in the prior art; however, as shown in FIG. 6, since one X-axis electrode (e.g., T2) disposed at the center part of the X-axis electrodes corresponds to four Y-axis electrodes R3, R4, R1, and R2, only five traces are necessary to be distributed within the touch active area of the capacitive touch panel. Therefore, under the same touch sensing area, since fewer traces distributed within the touch active area of the capacitive touch panel in this embodiment than the prior art, the touch inactive area of the capacitive touch panel in this embodiment of the invention is smaller than that of the capacitive touch panel in the prior arts.

As shown in FIG. 7, in order to enhance driving efficiency in the same geometry configuration, the X-axis electrodes disposed at two ends of the X-axis electrodes in this embodiment can be electrically connected, namely the X-axis electrodes disposed at two ends of the X-axis electrodes are both T1 (or T7), but not limited to this.

Figures 8, 9, 10:
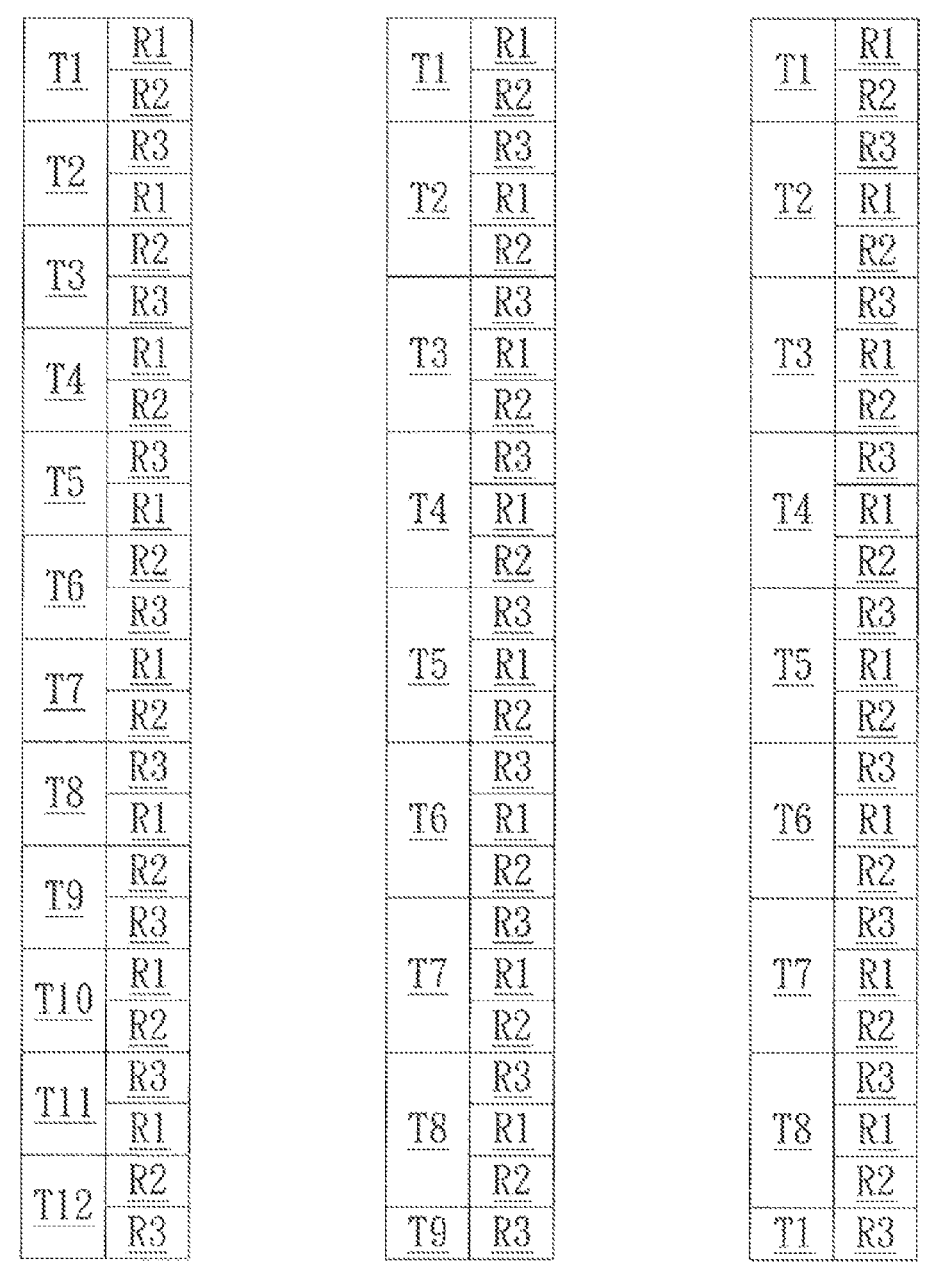

Please refer to FIG. 8. FIG. 8 illustrates a third embodiment of the electrode configuration of the first electrodes and the second electrodes in the single-layer touch sensor 12. As shown in FIG. 8, it is assumed that the first electrodes T1~T12 are X-axis electrodes and the second electrodes R1~R3 are Y-axis electrodes. Each of the X-axis electrodes T1~T12 corresponds to two Y-axis electrodes respectively, wherein the X-axis electrode T1 corresponds the two Y-axis electrodes R3 and R1; the X-axis electrode T3 corresponds the two Y-axis electrodes R2 and R3; the X-axis electrode T4 corresponds the two Y-axis electrodes R1 and R2; the X-axis electrode T5 corresponds the two Y-axis electrodes R3 and R1; the X-axis electrode T6 corresponds the two Y-axis electrodes R2 and R3; and so on.

Compared to the prior art, since two X-axis electrodes correspond to two Y-axis electrodes in FIG. 2 of the prior art, four traces are necessary to be distributed within the touch active area of the capacitive touch panel in the prior art; however, as shown in FIG. 8, since each X-axis electrode T1~T12 corresponds to two Y-axis electrodes respectively, only three traces are necessary to be distributed within the touch active area of the capacitive touch panel. Therefore, under the same touch sensing area, since fewer traces distributed within the touch active area of the capacitive touch panel in this embodiment than the prior art, the touch inactive area of the capacitive touch panel in this embodiment of the invention is smaller than that of the capacitive touch panel in the prior arts.

In addition, the electrode configuration of FIG. 8 is also different from those of FIG. 4~FIG. 7. As shown in FIG. 4 and FIG. 5, it can be found that each of the X-axis electrodes T2~T12 disposed at the center part of the X-axis electrodes T1~T13 corresponds the same two Y-axis electrodes R2 and R1; as shown in FIG. 6 and FIG. 7, it can be found that each of the X-axis electrodes T2~T6 disposed at the center part of the X-axis electrodes T1~T7 corresponds the same four Y-axis electrodes R3, R4, R1, and R2. That is to say, in the electrode configurations shown in FIG. 4~FIG. 7, each of the X-axis electrodes not disposed at two ends of the X-axis electrodes corresponds to the same Y-axis electrodes.

However, in the electrode configuration of FIG. 8, the X-axis electrodes T1~T3 correspond to different two Y-axis electrodes R1 and R2, R3 and R1, R2 and R3 respectively. Similarly, the X-axis electrodes T4, T7, and T10 correspond to the two Y-axis electrodes R1 and R2 just like the X-axis electrode T1; the X-axis electrodes T5, T8, and T11 correspond to the two Y-axis electrodes R3 and R1 just like the X-axis electrode T2; the X-axis electrodes T6, T9, and T12 correspond to the two Y-axis electrodes R2 and R3 just like the X-axis electrode T3. That is to say, in the electrode configuration of FIG. 8, the Y-axis electrodes corresponding to different X-axis electrodes can be the same or different.

Please refer to FIG. 9. FIG. 9 illustrates a fourth embodiment of the electrode configuration of the first electrodes and the second electrodes in the single-layer touch sensor 12. As shown in FIG. 9, it is assumed that the first electrodes T1~T9 are X-axis electrodes and the second electrodes R1~R3 are Y-axis electrodes. The X-axis electrodes T1 and T9 disposed at two ends of the X-axis electrodes T1~T9 only correspond to two Y-axis electrodes R1~R2 and one Y-axis electrode R3 respectively; each of the X-axis electrodes T2~T8 disposed at the center part of the X-axis electrodes T1~T9 corresponds to three Y-axis electrodes R3, R1, and R2 respectively.

Compared to the prior art, the X-axis electrodes and the Y-axis electrodes of FIG. 9 use the electrode configuration that the X-axis electrodes at two ends of the X-axis electrodes are arranged more densely than the X-axis electrodes at the center part of the X-axis electrodes, so that the requirement of the signal processing at two ends of the X-axis electrodes can be satisfied. It should be noticed that the X-axis electrode T1 disposed at one end of the X-axis electrodes T1~T9 corresponds two Y-axis electrodes R1 and R2, but the X-axis electrode T9 disposed at another end of the X-axis electrodes T1~T9 only corresponds one Y-axis electrode R3. Although the X-axis electrodes T1 and T9 disposed at two ends of the X-axis electrodes T1~T9 correspond different numbers of Y-axis electrode, the numbers of Y-axis electrode are both less than the three Y-axis electrodes corresponding to the ach of the X-axis electrodes T2~T8 disposed at the center part of the X-axis electrodes T1~T9.

In addition, since three X-axis electrodes correspond to three Y-axis electrodes in FIG. 2 of the prior art, six traces are necessary to be distributed within the touch active area of the capacitive touch panel in the prior art; however, as shown in FIG. 9, since one X-axis electrode (e.g., T2) disposed at the center part of the X-axis electrodes corresponds to three Y-axis electrodes R3, R1, and R2, only four traces are necessary to be distributed within the touch active area of the capacitive touch panel. Therefore, under the same touch sensing area, since fewer traces distributed within the touch active area of the capacitive touch panel in this embodiment than the prior art, the touch inactive area of the capacitive touch panel in this embodiment of the invention is smaller than that of the capacitive touch panel in the prior arts.

As shown in FIG. 10, in order to enhance driving efficiency in the same geometry configuration, the X-axis electrodes disposed at two ends of the X-axis electrodes in this embodiment can be electrically connected, namely the X-axis electrodes disposed at two ends of the X-axis electrodes are both T1 (or T9), but not limited to this.

Compared to the prior art, the invention provides a capacitive touch panel having novel electrode configuration design of the first electrodes and the second electrodes (X-axis electrodes and Y-axis electrodes) in the single-layer touch sensor. Without the conventional bridge structures, the capacitive touch panel of the invention can effectively decrease the number of the traces disposed within the active area of the capacitive touch panel and the touch inactive area of the capacitive touch panel; therefore, the requirement of the signal processing at two ends of the electrodes can be enhanced and the touch sensor structure of the capacitive touch panel can be also simple to reduce its cost.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. A capacitive touch panel, comprising:
   a laminated structure, comprising:
      a liquid crystal displaying module;
      a single-layer touch sensor, disposed on the liquid crystal displaying module, the single-layer touch sensor comprising:
         a plurality of first electrodes; and
         a plurality of second electrodes; and
      a polarizing module, disposed on the single-layer touch sensor;
      wherein, the plurality of first electrodes and the plurality of second electrodes are configured in an asymmetric electrode arranging way, so that a first electrode of the plurality of first electrodes is arranged corresponding to at least two second electrodes of the plurality of second electrodes, the first electrode is disposed in a center part of the plurality of first electrodes instead of being disposed at two ends of the plurality of first electrodes, another first electrode of the plurality of first electrodes is disposed at one of the two ends of the plurality of first electrodes, and the another first electrode is arranged corresponding to another at least one second electrode of the plurality of second electrodes, the number of the another at least one second electrode corresponding to the another first electrode is smaller than that of the at least two second electrodes corresponding to the first electrode.

2. The capacitive touch panel of claim 1, wherein still another first electrode of the plurality of first electrodes is also disposed in the center part of the plurality of first electrodes instead of being disposed at the two ends of the plurality of first electrodes, the still another first electrode is arranged corresponding to still another at least two second electrodes of the plurality of second electrodes, and the number of the still another at least two second electrodes corresponding to the still another first electrode is equal to that of the at least two second electrodes corresponding to the first electrode.

3. The capacitive touch panel of claim 2, wherein the at least two second electrodes are the same with the still another at least two second electrodes.

4. The capacitive touch panel of claim 2, wherein the at least two second electrodes are different from the still another at least two second electrodes.

5. The capacitive touch panel of claim 1, wherein the another first electrode and still another first electrode of the plurality of first electrodes are disposed at the two ends of the plurality of first electrodes respectively, and the another first electrode is arranged corresponding to another at least one second electrode of the plurality of second electrodes and the still another first electrode is arranged corresponding to still another at least one second electrode of the plurality of second electrodes.

6. The capacitive touch panel of claim 5, wherein the number of the another at least one second electrode corresponding to the another first electrode is equal to that of the still another at least one second electrode corresponding to the still another first electrode.

7. The capacitive touch panel of claim 6, wherein the another at least one second electrode is different from the still another at least one second electrode.

8. The capacitive touch panel of claim 5, wherein the number of the another at least one second electrode corresponding to the another first electrode is different from that of the still another at least one second electrode corresponding to the still another first electrode.

9. The capacitive touch panel of claim 1, wherein the another first electrode of the plurality of first electrodes is disposed at the two ends of the plurality of first electrodes simultaneously, and the another first electrode is arranged corresponding to the another at least one second electrode and still another at least one second electrode of the plurality of second electrodes corresponding to the two ends of the plurality of first electrodes simultaneously.

10. The capacitive touch panel of claim 1, wherein the plurality of first electrodes is driving electrodes and the plurality of second electrodes is sensing electrodes.

11. The capacitive touch panel of claim 1, wherein the plurality of first electrodes is sensing electrodes and the plurality of second electrodes is driving electrodes.

* * * * *